United States Patent [19]

Shearing

[11] Patent Number: 5,269,482
[45] Date of Patent: Dec. 14, 1993

[54] PROTECTIVE ENCLOSURE APPARATUS FOR MAGNETIC PROPULSION SPACE VEHICLE

[76] Inventor: Ernest J. Shearing, 297 W. Grand Ave., Porterville, Calif. 93257

[21] Appl. No.: 767,794

[22] Filed: Sep. 30, 1991

[51] Int. Cl.$^5$ .............................. B64G 1/46
[52] U.S. Cl. .......................... 244/163; 244/158 R
[58] Field of Search ............ 244/163, 158 R, 172, 244/166

[56] References Cited

U.S. PATENT DOCUMENTS

| | | | |
|---|---|---|---|
| 3,095,167 | 6/1963 | Dudley | 244/62 |
| 3,495,791 | 2/1970 | Drell | 244/158 R |
| 3,504,868 | 4/1970 | Engelberger | 244/172 |
| 3,749,156 | 7/1973 | Fletcher et al. | 244/163 |
| 4,746,085 | 5/1988 | Brüderle | 244/166 |
| 4,795,113 | 1/1989 | Minovitch | 244/172 |
| 4,881,446 | 11/1989 | Marks et al. | 244/63 |
| 5,017,549 | 5/1991 | Robertson | 244/63 |
| 5,047,945 | 9/1991 | Paluszek | 244/166 |
| 5,081,071 | 1/1992 | Hirschkoff | 505/1 |

FOREIGN PATENT DOCUMENTS

8801245 2/1988 PCT Int'l Appl. .................. 244/172

Primary Examiner—Joseph F. Peters, Jr.
Assistant Examiner—Anne E. Bidwell
Attorney, Agent, or Firm—Fulwider Patton Lee & Utecht

[57] ABSTRACT

The protective enclosure for a space vehicle with a magnetic propulsion system includes an insulated Dewar vessel formed of walls of superconducting material surrounded and suspended by superconducting magnets. The superconducting walls shield the interior of the enclosure from external magnetic and electric fields, and the superconducting walls and corresponding magnetics act to cushion passengers or equipment within the enclosure from acceleration or gravitational forces. One or more accelerometers are preferably provided for sensing acceleration or gravity in each of the three orthogonal axes of the enclosure, and a control unit is also preferably provided for controlling the superconducting magnets of the enclosure responsive to output signals from the accelerometers.

15 Claims, 6 Drawing Sheets

FIG. 12

PROTECTIVE ENCLOSURE APPARATUS FOR MAGNETIC PROPULSION SPACE VEHICLE

BACKGROUND OF THE INVENTION

1. Field of the Invention

This invention relates generally to space vehicles, and more particularly relates to a superconductor enclosure for a space vehicle having a magnetic propulsion system.

2. Description of Related Art

Proposals have been made for space vehicles with magnetic propulsion systems, such as for maintaining a spacecraft in orbit, or for launching a space vehicle from the surface of the earth. Such space vehicles would utilize coils or wires attached to the vehicle carrying a current to induce a magnetic field to interact with the earth's own magnetic field, to thereby propel the vehicle. One such proposal involves the use of superconductive material maintained in a temperature region at which superconductivity occurs. Thus, once current flow is established in the coil or loop, current will continue to flow in the superconducting material without requiring additional energy. A cryogenic cooling system may be employed to circulate supercooled fluid such as liquid helium adjacent to the superconductive material. In one proposal for a propulsion system for a space vehicle, interchanges of electromechanical energy with the magnetic field of the earth are used to produce electrical energy for utilization by the space vehicle, and to reduce kinetic energy.

Generally, the principal means of propulsion for such types of vehicles would be magnetic. The magnetic fields can be used for take-off and landing, or hovering at a fixed altitude. Conventional types of solid fuel or liquid fuel boosters may be used for added thrust, or for directional control. Another proposal for boosting thrust or attitude control of a space vehicle within the atmosphere envisions the creation of high electrostatic charges on the surface of the vehicle, on the order of from 25,000 to 1,000,000 volts, by means of an electrostatic generator, although even such large electrostatic charges are generally so weak that they are insufficient for thrust or directional control of a large space vehicle, and would be suitable for only small objects. However, such electrostatic charges may be useful in limited instances for thrust and directional control of a space vehicle, and such charges may be used in a spinning vehicle for communication. Since a spinning charged space vehicle can emit visible radiation, by varying the rate of spin, different frequencies of light might be used for communication, since the magnetic field of the moving space vehicle would be likely to interfere with standard radio communication. Such conventional drive systems and electromechanical and electrostatic systems used in conjunction with a superconducting magnet propulsion system can subject a crew or passengers of the vehicle to high acceleration. To produce the high currents necessary to propel a space vehicle, either a superconducting generator or an ordinary generator charging a bank of superconducting capacitors may be used. Such a magnetic propulsion system using superconducting cables can be expected to generate extremely high magnetic fields of, for example, 10-20 or higher teslas.

In order to protect a crew from the extremely powerful electric and magnetic fields developed in such magnetic and electrostatic systems, it would be desirable to provide such a space vehicle with a protective enclosure that would screen out magnetic and electric fields. It would also be desirable for such an enclosure to protect passengers or crew within the enclosure from acceleration and gravitational forces, preferably in three orthogonal axes.

SUMMARY OF THE INVENTION

Briefly, and in general terms, the present invention provides for a protective enclosure for a space vehicle with a magnetic propulsion system. The protective enclosure formed by an insulated Dewar vessel surrounded on all sides by superconducting walls which shield the interior of the enclosure from external magnetic and electric fields. The superconducting enclosure is also surrounded by superconducting magnets which serve to cushion passengers or crew within the enclosure from acceleration and gravitational forces by inducement of eddy currents in the superconducting enclosure walls.

The apparatus of the invention accordingly provides for a protective enclosure apparatus having an insulated housing with three orthogonal axes and three corresponding pairs of orthogonal walls formed of superconducting material and superconducting magnets disposed adjacent to each of the walls of the housing. Generator means are provided for generating electric current through each of the superconducting magnets connected to the superconducting magnets, and means are preferably provided for sensing acceleration in each of the three orthogonal axes. Means are also preferably provided for controlling the generator means responsive to the means for sensing acceleration.

In one preferred form of the invention, the housing walls form a Dewar vessel to insulate the enclosure. An inlet for air and water, protective padding on the inner surfaces of the walls, and means for controlling the temperature within the enclosure are preferably provided to support an environment for a crew and passengers within the enclosure.

These and other aspects and advantages of the invention will become apparent from the following detailed description, and the accompanying drawing, which illustrates by way of example the features of the invention.

DETAILED DESCRIPTION OF A PREFERRED EMBODIMENT

The intensity of magnetic and electric fields used in a magnetic propulsion system for a space vehicle, and the accelerative and gravitational forces within such a vehicle, with or without other types of solid fuel or liquid fuel boosters, or high electrostatic charges on the surface of the vehicle, can be dangerous to the health and safety of a crew or passengers in such a vehicle.

As is illustrated in the drawings, the invention is embodied in a protective enclosure apparatus for a space vehicle having a magnetic propulsion system, for shielding the contents of the enclosure from forces of acceleration and magnetic and electric fields generated outside the enclosure.

Figure 1:
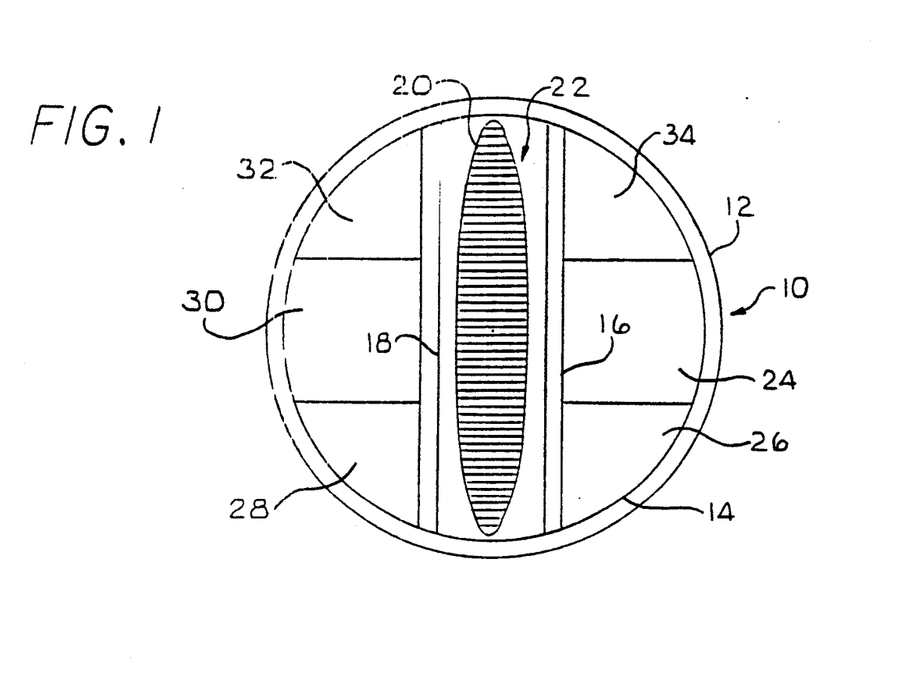
FIG. 1 shows a spherical magnetic space vehicle with which the protective enclosure apparatus may be used.
Figure 2:
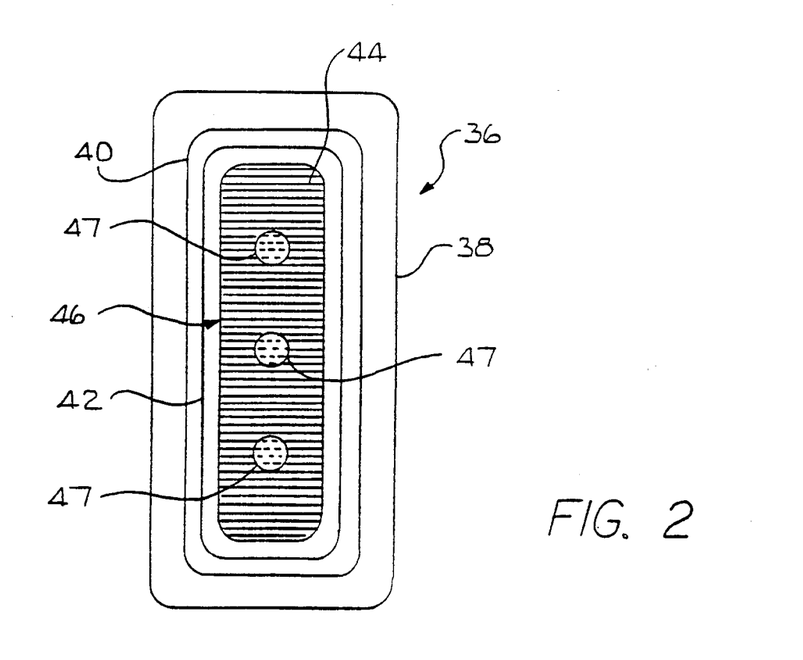
FIG. 2 shows an oblong magnetic space vehicle with which the protective enclosure apparatus may be used.
Figure 3:
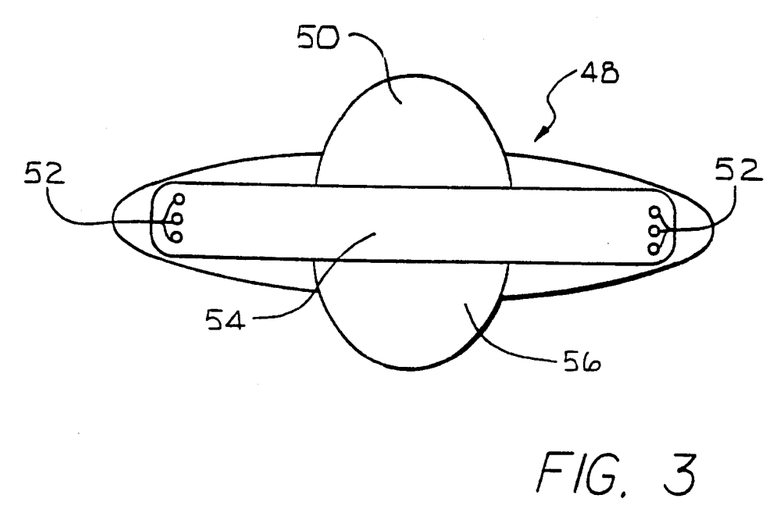
FIG. 3 shows a disk shaped magnetic space vehicle with which the protective enclosure apparatus may be used.

Three different representative types of magnetic propulsion space vehicles are illustrated in FIGS. 1-3. One proposed magnetic space vehicle 10 having a round or spherical configuration is illustrated in FIG. 1, and includes a hull 12 formed from steel or titanium, for example, and an inner wall 14, also of steel or titanium, covered by a silicon shield. A thick silicon shield 16 can also be disposed around a Dewar vessel 18, which could be formed from quartz glass, for example, which in turn contains superconducting cable windings 20 about the superconducting magnet 22, which may be formed from room temperature superconductor material, or ordinary $Nb_3Sn$ superconductor material or highly stressed alloys which are superconductive, for the magnetic drive. The central magnet can preferably be hollow, in order to help minimize the overall weight of the vehicle, and can preferably be constructed in the form of a closed prolate ellipsoid. However, the central magnet may also take the form of an open cylinder or tube with means for producing current on both the inside and the outside of the cylinder. A superconducting piston is placed in the superconducting cylinder, to create flux compression and increase the strength of the magnetic field. The space vehicle preferably would include a crew chamber 24, including living quarters, computers, and the like, and a section 26 for a cryostat and pump system for maintaining a cryogenic state of superconductivity in the superconducting cables. The space vehicle may also include a chamber 28 for tanks for fuel or chemicals such as $Ca(MnO_4)_2$ and $H_2O_2$ for generating steam. A chamber 30 for a turbine and generator, or alternator and rectifier, and a compartment 32 for wiring and other circuitry for the superconducting magnet and other electrical devices may also be provided. The vehicle would also preferably contain one or more sections 34 for a ventilation system, including pumps for air, vents for air conditioning, and $Na_2O_2$ to remove $CO_2$ and add oxygen.

As is illustrated in FIG. 2, another type of magnetic space vehicle 36 could also be oblong. Such a vehicle would also include an outer skin 38 of steel or titanium, for example, an inner wall 40 of steel or titanium, and a Dewar vessel 42. The windings of superconducting cable 44 and the superconducting magnet 46 having cavities 47 for weight reduction are preferably contained within the Dewar vessel. The magnetic drive may alternately utilize a flux compression magnetic system. Crew compartments and chambers (not shown) for life support and propulsion systems, and the like may also be provided.

Figure 4:
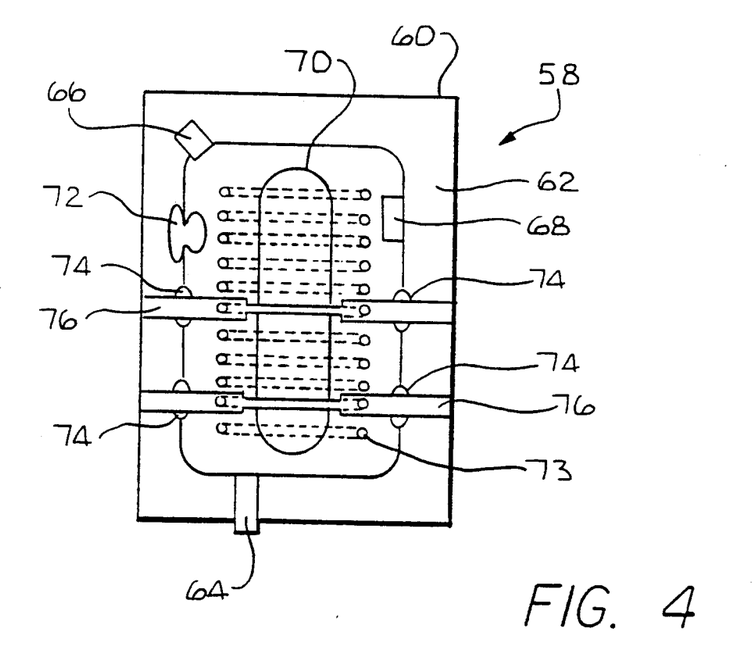
FIG. 4 is a diagram of the superconducting magnet of the propulsion system of the magnetic space vehicle encased in a Dewar flask.

With reference to FIG. 3, the magnetic space vehicle may also be a disk shaped magnetic space vehicle 48, also containing a crew chamber 50, and sections for superconducting cable windings 52, room temperature superconductor magnet 54 or flux compression magnet, and a superconductor generator 56, for example. As is illustrated in FIG. 4, in each of the embodiments of FIGS. 1-3, the superconducting magnet of the magnetic propulsion system is sealed in a generally cylindrical Dewar flask 58 which may for example have a housing 60, which contains a spill reservoir 62 for liquid helium or nitrogen, which may be particularly necessary if flux compression is used, an inlet valve 64 for liquid helium or nitrogen, and an outlet valve 66 from the Dewar container to the spill reservoir. A heating element 68 is provided to permit termination of the superconducting state of the superconducting magnet 70. A seal 72 is provided for the superconducting fluid around the superconducting cable 73, along with seals 74 around yokes 76 holding the superconducting magnet, and seals (not shown) for conducting electricity from the generator to the coils surrounding the superconducting magnet, which may be made of conventional $Nb_3Sn$ superconducting materials or alloys of vanadium or titanium or the like, or room temperature superconducting material, for example. The current in the cables and the magnets inside the sealed Dewar flask will continue as long as superconductivity in them is maintained. The central magnet or magnet tube is subjected to extremely high magnetic fields, such as 10-20 teslas, or possibly higher, produced by powerful currents around the superconducting magnet, which can be adjusted so that the magnetic field of the ship is repelled or attracted to the earth, or other magnetic body, such as another planet, the sun, or a star. The central magnet of the ship acquires north and south poles, like a bar magnet, repelling or attracting itself in relation to a magnetic body such as the earth, so that takeoff from a planet such as the earth can be accomplished from the North or South magnetic poles, or magnetic fault zones elsewhere.

To effect a descent through the magnetic field of the earth with such a magnetic propulsion system, the superconducting windings can be allowed to revert to an ordinary state of conductivity, so that the repulsive force of the drive can be used to slowly lower the craft. Alternatively, current could be withdrawn from the magnet while superconductivity was maintained, allowing induced eddy currents in the magnet to maintain the ship's position over a magnetic fault zone, for example, or allow for a steady, slow descent. To hover, an oscillating current can be carried by the coil surrounding the magnet, to induce an alternating current in the magnet. For planets without a sufficient magnetic field, extremely large superconducting plates, on the order of at least the size of a football field, could be placed on the surface of the planet. In this case, an alternating current can be conducted through the magnet, and the induced eddy currents in the superconducting plate would repel the craft. Travel to other planets lacking a magnetic field may also be facilitated with solid or liquid fuel booster rockets, which could also be used for braking and lift-off from a planet's surface.

Figure 5:
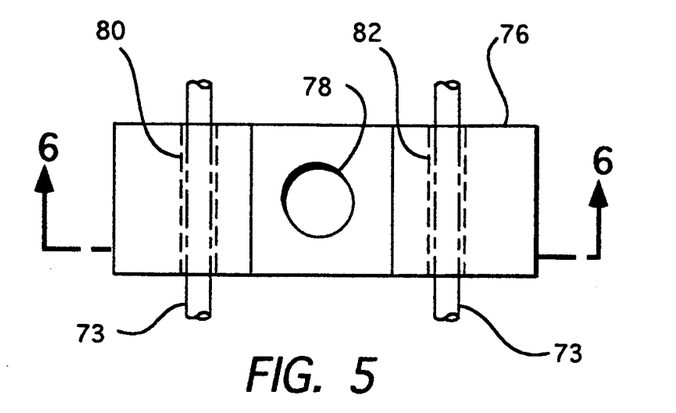
FIG. 5 is a top plan view of a yoke for securing a superconducting magnet.
Figure 6:
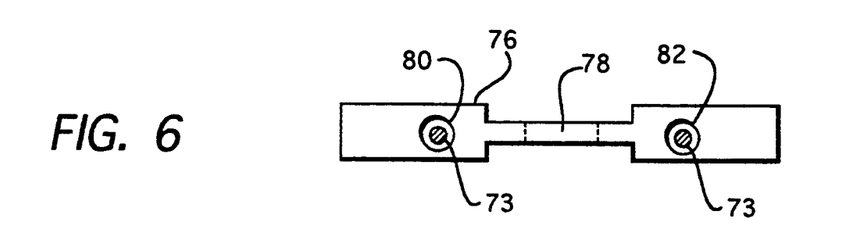
FIG. 6 is a cross-sectional view of the yoke of FIG. 5 taken along line 6—6.

With reference to FIGS. 4, 5 and 6, an exemplary yoke 76 for securing a superconducting magnet includes an aperture 78 for receiving the superconducting magnet lengthwise, and channels 80 and 82 through the yoke for the windings of the superconducting cables 73 about the magnet shown in FIGS. 4, 5 and 6. A plurality of such yokes are preferably secured to the superconducting magnet, such as by bolts or welding, at the apertures of the yokes, and the end of the yokes are preferably attached to the surrounding housing structure of the ship, which is preferably constructed from steel or titanium.

Figure 7:
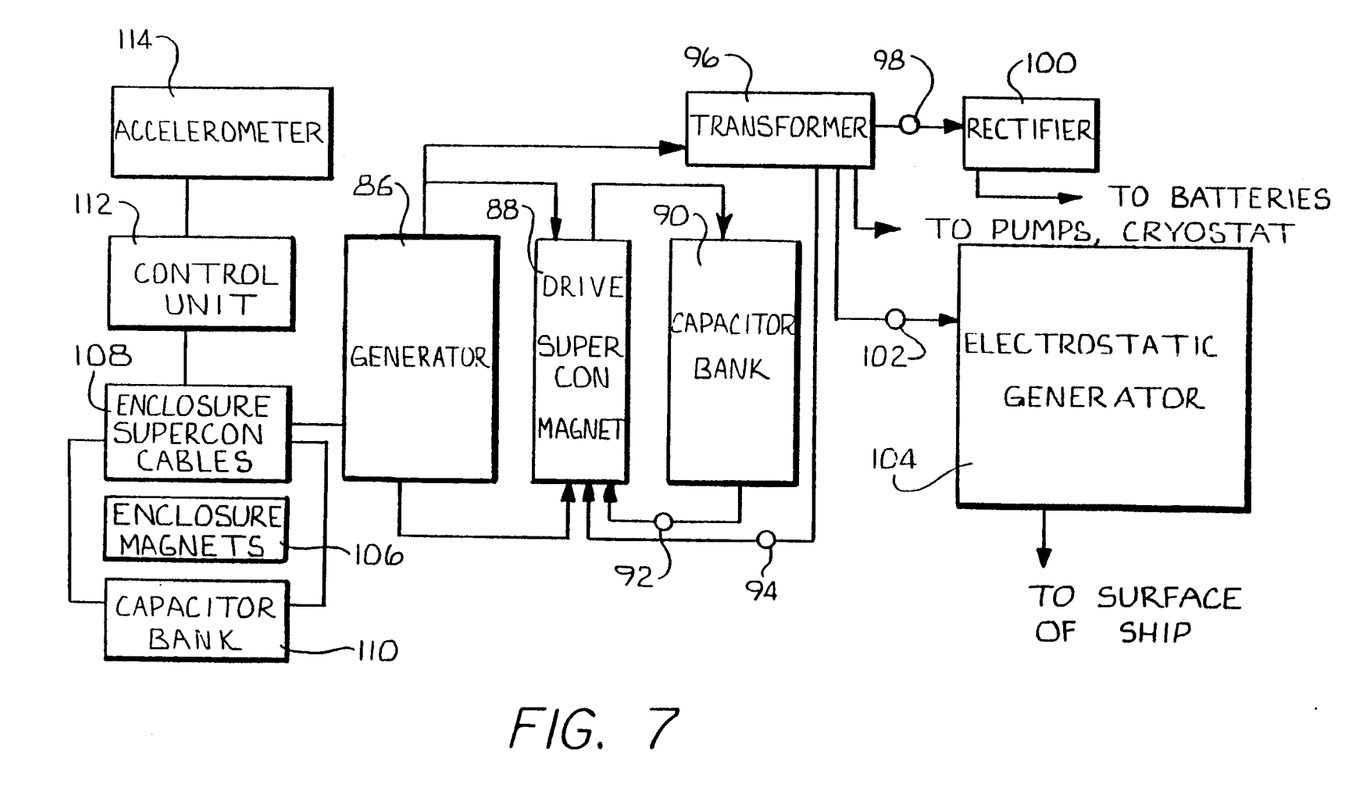
FIG. 7 is a schematic circuit diagram of the magnetic space vehicle and protective enclosure.

Referring to FIG. 7, illustrating the major components of the electrical circuitry of the magnetic space vehicle, the electrical system of the vehicle includes an electrical generator 86 for providing electrical current to the superconducting magnet cable windings 88. To produce the high currents required for the magnetic propulsion system, the generator is preferably a superconducting generator, but an ordinary generator may also be used which charges a bank of superconductor capacitors 90. The capacitor bank can be drained to set up currents in the magnet, while a smaller generator or batteries run the air conditioning system, pumps, valves and cryostat. Alternatively, an alternator and rectifier may also be used for generating electrical current. The generator can be powered by many sources, such as compressed or cryogenic gases (if room temperature superconductor material is used), nuclear power, or steam, such as may be generated from 60% or higher concentrations of $H_2O_2$ and $Ca(MnO_4)_2$. The capacitor bank is preferably electrically connected in parallel to the coils of the superconducting magnet of the propulsion system with an interrupter switch 92. The superconducting magnet is also preferably connected through switch 94 to transformer 96, which is electrically connected to the generator. The transformer may also be connected through switch 98 to a rectifier 100 for charging storage batteries. The transformer may also be connected through a switch 102 to an electrostatic generator 104 which may also be provided so that the magnetic space vehicle may use static electric charges on the surface of the vehicle for altering speed or altitude. By rotating or accelerating the vehicle, the electric charges on the surface of the vehicle would also emit electromagnetic radiation. Thus if the spin or acceleration of the vehicle were sufficient, the ship could emit visible light, or other spectra of detectable radiation.

To protect the crew of the magnetic space vehicle from the high magnetic and electrical fields generated by the vehicle, both the generator and the crew quarters are preferably shielded by a protective, superconducting enclosure, since the external electric and magnetic fields vanish inside a superconductor. Six superconducting magnets 106 are therefore preferably arranged in pairs about the protective enclosure and are preferably energized by the superconducting cables 108 electrically connected to the generator and/or superconducting capacitor bank 110 for the protective enclosure, operating to counteract gravity and acceleration. The current flow through the enclosure superconducting magnet pairs are preferably governed by a control unit 112 such as a computer which is interfaced with one or more accelerometers 114 which may be situated at various points in the ship for sensing acceleration in each of three orthogonal axes of the enclosure and which operate to generate output signals to the control unit indicative of the force of acceleration along each of the axes.

Figure 8:
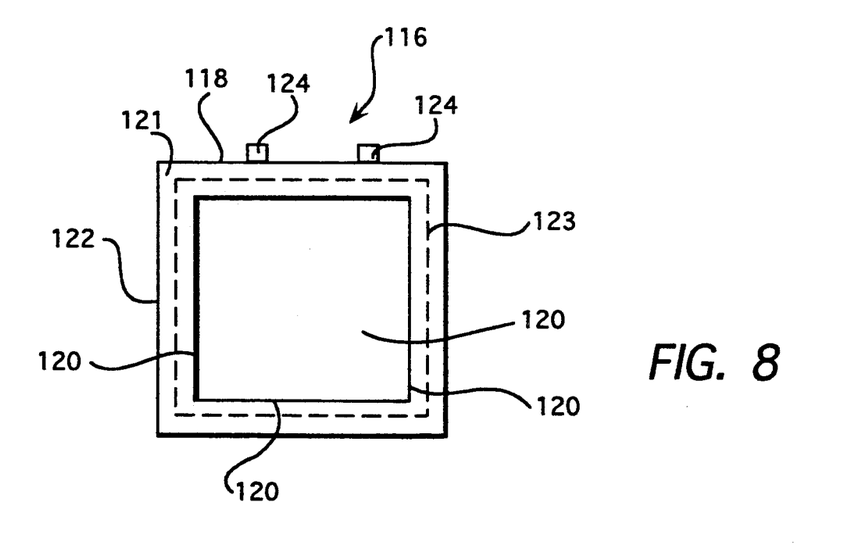
FIG. 8 is a side elevational view of the protective enclosure of the invention for use in a magnetic space vehicle.
Figure 9:
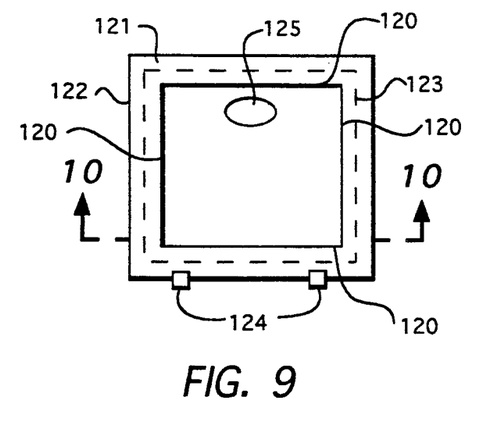
FIG. 9 is a top plan view of the protective enclosure of FIG. 8.
Figure 10:
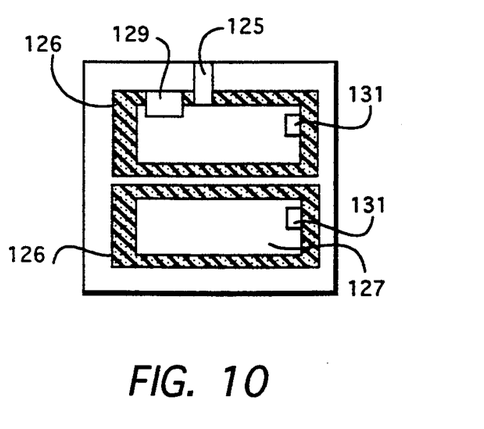
FIG. 10 is a cross-sectional view of the protective enclosure taken along line 10—10 of FIG. 9.
Figure 11:
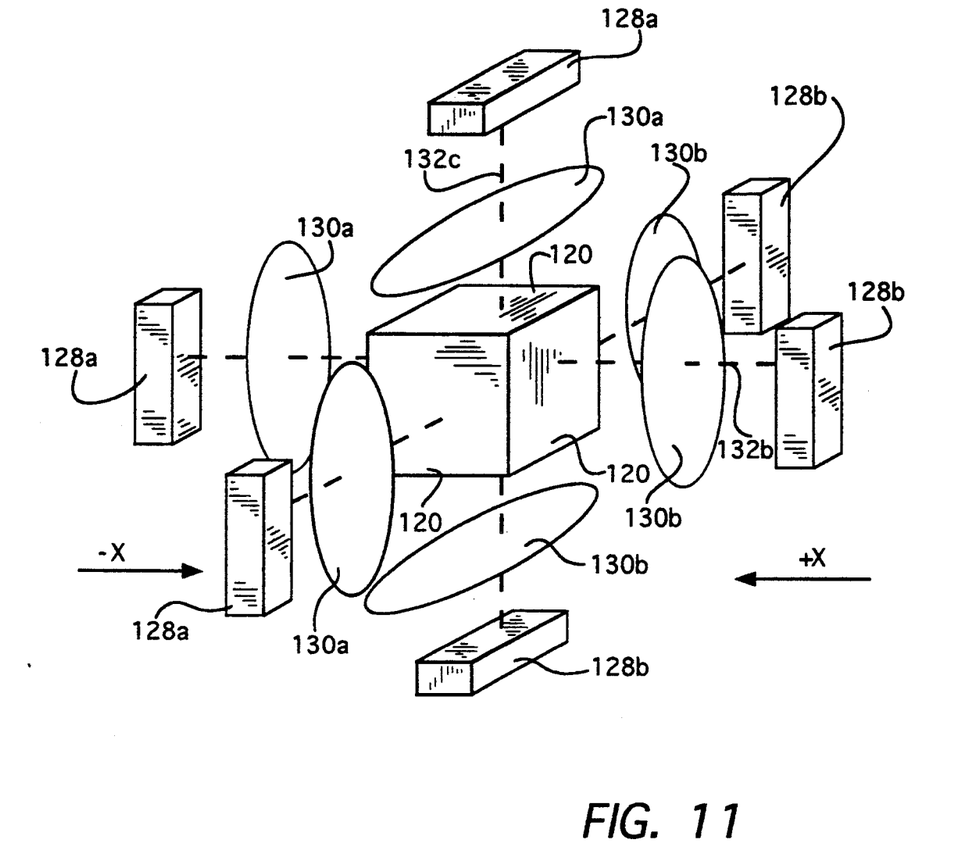
FIG. 11 is a perspective view of the protective enclosure illustrating the orthogonal magnetic fields arrayed around the enclosure.

A protective enclosure for the crew is illustrated in greater detail in FIGS. 8-11. It will be apparent that with minor modifications the enclosure may be adapted to shield a generator. Thus, it can be seen that in a preferred embodiment the protective enclosure apparatus or sarcophagus 116 is generally cubical, and includes a housing 118 preferably having superconducting walls 120, preferably formed of a room temperature superconducting material, arrayed in pairs about three corresponding axes and surrounded on the bottom and four side walls by a Dewar container 121, as shown in FIG. 8. In one preferred form of the invention, the Dewar container is formed from five orthogonal pairs of inner and outer walls 122 and 123 encasing the bottom and four side walls 120 of superconducting material. It is preferable to use room temperature superconductor plates attached to all sides of the crew enclosure or sarcophagus, although ordinary superconducting material may also be used. Gravitational and accelerative forces are counteracted by induced eddy currents in the plates, which are repelled by superconducting magnets disposed around the plates. As is illustrated in FIG. 9, the enclosure may include a lid separate from the Dewar vessel. The lid is preferably connected to the Dewar vessel on one side by having hinges 124 or a flexible cryogenic tube, and a protective padding such as a foam rubber cushion 126 is preferably provided along the inside of the inner walls of the enclosure. The enclosure may also include one or more subcompartments 127. Insulation may also be provided between the Dewar flask and the compartment which the crew occupies. An air and water inlet or vent 125 through the housing may also be provided for the crew. A console 129 and a device for controlling temperature control, such as a heater and thermostat (3) may be provided as well. As is best schematically illustrated in FIG. 11, superconducting walls of the enclosure 116 are surrounded by three pairs of superconducting magnets 128a,b disposed adjacent to the corresponding walls of the enclosure and electrically connected to the electrical current source such as the generator and/or the superconducting capacitor bank for producing three pairs of orthogonal magnetic fields 130a, 130b about the orthogonal axes 132a,b,c. Thus, for example, in the case of accelerative or gravitational force in the +"x" direction, the magnet located along the +"x" direction is turned off, and the magnet located along the −"x" direction is turned on. Thus, as the enclosure superconductor walls move in the −"x" direction, by inertia the superconducting magnet induces eddy currents in the superconducting walls which grow stronger as the separation between the edge of the sarcophagus at the −"x" side and the magnet decreases. While this system could not counteract the tidal forces near a black hole or a neutron star, this system creates an opposing force on the sarcophagus, so that the passengers and crew would feel only a slight force as the eddy current force counteracts the accelerative or gravitational force, under ordinary circumstances.

Figure 12:
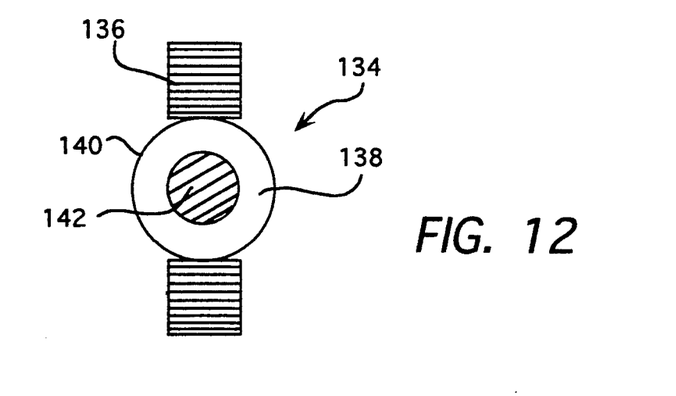
FIG. 12 is a cross-sectional view of a current control device for use with the magnetic drive of the space vehicle and the protective enclosure.

With reference to FIG. 12, associated with the control unit are one or more current control devices 134, preferably including an electromagnet 136, a chamber 138 for carrying cryogenic liquid flow having a sleeve 140 preferably covered with a protective material such as Teflon, about the superconducting cable 142, which may typically be formed of lead or tin. Ordinary superconductors lose their ability to carry current if a critical value of the external magnetic field is exceeded. The electromagnet provides this field. The control unit is thus electrically connected to the electromagnet, which can by energized to instantaneously control the flow of current through the superconducting cables of the protective enclosure, to increase or decrease the repulsion between the superconducting material of the enclosure walls and the enclosure superconducting magnets in response to accelerational or gravitational forces along the orthogonal axes of the enclosure, to cushion and maintain the position of the enclosure. It is not envisioned that the passengers or crew would need to occupy the sarcophagi for more than a few minutes, even if the magnetic space vehicle undergoes gentle acceleration. For operation in the atmosphere, lower currents may be utilized.

Figure 13:
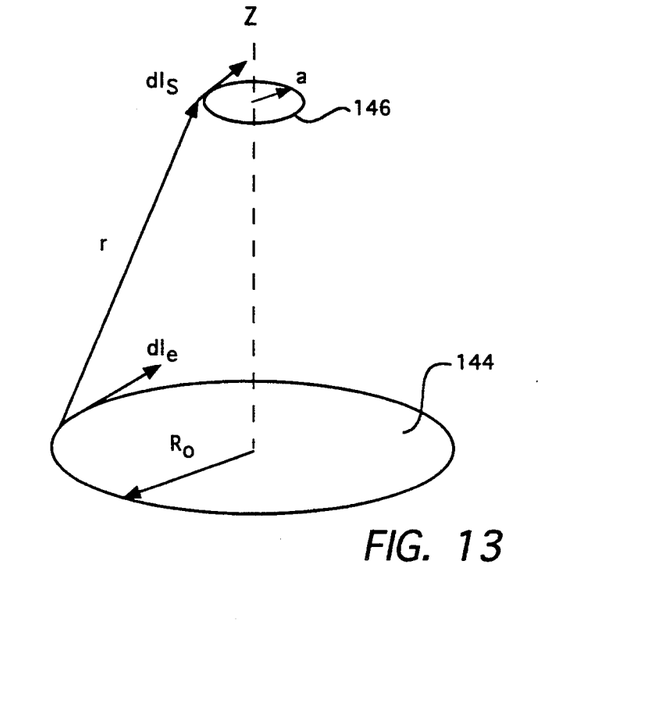
FIG. 13 is an illustrative diagram of the magnetic fields of superconducting loops geometrically representing the magnetic relationship of the earth and a magnetic space vehicle.

With reference to FIG. 13, for purposes of determining the thrust force which may be generated by such a magnetic space vehicle, based upon takeoff from the North or South magnetic poles of the earth, it is possible to assume that the magnetic fields of both the earth and the space vehicle can be given by calculations for a circular loop of wire inside or around the earth having a magnetic field plane 144, and a circular loop of wire inside the space vehicle having a magnetic field plane 146. It can then be assumed that the magnetic field of the earth can be replaced by a solenoid of a length $2R_o$, where $R_6$ is the radius of the earth, and that the magnetic field of the ship can be replaced by a solenoid having a length $2a$, where the ship has a coil of a radius 'a'. The coils can be assumed to be situated so that the coil for the earth is a radius $R_o$ above the xy plane of the earth at its near terminus and a radius $R_o$ below the plane at its far terminus. The coil of the ship is similarly assumed to be located at a distance 'z' above (or below) the xy plane of the earth. It may be further assumed that the magnetic induction B, as applied to both coils, is simply a multiple of the induction for two circular loops. The total current in the earth, expressed as $N_e I_e$, the current in a solenoid with $N_e$ turns, may be derived from Equation 1:

$$B_{ze} = (u_o/2)((R_o^2 N_e I_e)/(R_o^2 + z^2)^{3/2}) \quad Eq. 1$$

where
$u_o = 1.26 \times 10^{-6}$ henry/meter;
$R_o = 6.37 \times 10^6$ meters;
m (mass of the ship) $= 9.072 \times 10^4$ kg.;
$B_{ze}$ (z component of the earth's magnetic field at the North or South pole) $= 6.0 \times 10^{-5}$ teslas;
$N_s$ (number of turns of cables in the ship's magnet) $= 100$; and
$I_s$ (ship's current) $= 1.00 \times 10^{10}$ amps/turn.

Solving for the total current in the earth $N_e I_e$ for $z = R_o$ gives $N_e I_e = 1.716 \times 10^9$ amperes.

The mutual inductance $M_{es}$ can be given by Equation 2, as follows:

$$M_{es} = (u_o/4\pi) \oint_e \oint_s \frac{\vec{dl_e} \cdot \vec{dl_s}}{r} \quad Eq. 2$$

where 'r' is the distance from a differential element of length of the earth solenoid ($dl_e$) to a differential element of length on the ship solenoid ($dl_s$). Although this can vary from $R_o + a$, to $R_o - a$, since $R_o >> a$, the distance from $dl_e$ to $dl_s$ is then given by r, where $r = (R_o^2 + z^2)^{\frac{1}{2}}$. With this simplification, we have:

$$M_{es} = (u_o/4\pi r) \oint_e \oint_s \vec{dl_e} \cdot \vec{dl_s} \quad Eq. 3$$

$dl_e \cdot dl_s = p_e p_s dO_e dO_s$ (using cylindrical coordinates), where $p_e = R_o$ and $p_s = a$. Hence, Equation 3 becomes:

$$R_o a \oint_e \oint_s d\phi_e \, d\phi_s = (4\pi^2 R_o a) \quad Eq. 4$$

Therefore, $$M_{es} = (\pi u_o R_o a)/(R_o^2 + z^2)^{\frac{1}{2}} \quad Eq. 5$$

and for $z = R_o$, where $a = 10$ meters, $$M_{es} = 2.799 \times 10^{-5}$$

Neglecting gravitational force, to calculate an approximate velocity of the ship, one can compute the force and integrate from $R_o$ to infinity. The force is given by:

$$F = + (N_e I_e)(N_s I_s) \frac{(\delta M_{es})}{\delta z}$$

Thus the work is given by:

$$E = (N_e I_e)(N_s I_s)(M_{es})$$

Using Equation 6 and the values of $N_s$, $I_s$, $N_e I_e = 1.716 \times 10^9$ amperes, and the result from Equation 5 that $M_{es} = 2.799 \times 10^{-5}$, the work E is $4.803 \times 10^{16}$ joules. From the equation for velocity, $$v = (2E/m)^{\frac{1}{2}} \quad Eq. 7$$

Thus, velocity can be approximated at $1.029 \times 10^6$ meters/sec, or 639 miles/sec. This is of course an optimal value, and in actual practice the value would be less, unless it is possible to create a magnetic space vehicle weighing less than 100 tons, or larger coils or multiple windings and higher currents are feasible.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A protective enclosure apparatus for a space vehicle for shielding the contents of the enclosure from forces of acceleration and magnetic and electric fields outside the enclosure, said enclosure having three orthogonal axes, and comprising:
   a) three pairs of orthogonal walls formed of superconducting material disposed about said three orthogonal axes;

b) three pairs of superconducting magnet means disposed respectively adjacent to each of said six orthogonal superconducting walls, and means for energizing said superconducting magnet means;

c) generator means electrically connected to said means for energizing said superconducting magnet means for generating a flow of electric current through said means for energizing said superconducting magnet means;

d) means for sensing accelerative forces in each of said three orthogonal axes and operative to generate an output signal indicative of said accelerative forces along each of said axes; and e) means connected to said means for sensing accelerative forces for controlling said flow of electric current through said means for energizing said superconducting magnet means responsive to said output signal from said means for sensing accelerative forces to protect said contents of said enclosure from said accelerative forces.

2. The apparatus of claim 1, wherein said enclosure is encased about five of said walls by a Dewar container.

3. The apparatus of claim 1, wherein at least one of said walls includes a lid having an inlet for air and water.

4. The apparatus of claim 1, further including protective padding on the inner surfaces of said walls.

5. The apparatus of claim 1, further including means for controlling temperature within said enclosure.

6. The apparatus of claim 1, wherein said generator means comprises a superconductor generator.

7. The apparatus of claim 1, wherein said generator means comprises a generator with superconductor charging capacitors.

8. The apparatus of claim 1, wherein said means for controlling said flow of electric current comprises a superconducting cable disposed within a chamber for carrying cryogenic fluid flow, with said superconducting cable and chamber being disposed within an electromagnet operatively connected to said means for controlling said flow of electric current to control superconductivity of said superconducting cable.

9. A protective enclosure apparatus for a space vehicle for shielding the contents of the enclosure from forces of acceleration and magnetic and electric fields outside the enclosure, said enclosure having three orthogonal axes, and comprising:

a) a housing having top, bottom, and four side walls formed of superconducting material disposed about said three orthogonal axes;

b) three pairs of superconducting magnets disposed respectively adjacent to each of said six superconducting walls, and superconducting cable windings around said superconducting magnets for energizing said superconducting magnets;

c) a Dewar vessel encasing said bottom and four side walls and having a lid for covering said top wall;

d) generator means electrically connected to said cable windings for generating a flow of electric current through said superconducting cable windings;

e) means for sensing accelerative forces in each of said three orthogonal axes and operative to generate an output signal indicative of said accelerative forces along each of said axes; and f) means connected to said means for sensing accelerative forces for controlling said flow of electric current through said superconducting cable windings to control the energizing of said superconducting magnets responsive to said output signal from said means for sensing accelerative forces to protect said contents of said enclosure from said accelerative forces.

10. The apparatus of claim 9, wherein said lid includes an inlet for air and water.

11. The apparatus of claim 9, further including protective padding on the inner surfaces of said walls.

12. The apparatus of claim 9, further including means for controlling temperature within said enclosure.

13. The apparatus of claim 9, wherein said generator means comprises a superconductor generator.

14. The apparatus of claim 9, wherein said generator means comprises a generator with superconductor charging capacitors.

15. The apparatus of claim 9, wherein said means for controlling said flow of electric current comprises a superconducting cable disposed within a chamber for carrying cryogenic fluid flow, with said superconducting cable and chamber being disposed within an electromagnet operatively connected to said means for controlling said flow of electric current to control superconductivity of said superconducting cable.

* * * * *